United States Patent
Wuister et al.

(10) Patent No.: US 10,127,336 B2
(45) Date of Patent: Nov. 13, 2018

(54) METHOD OF SIMULATING FORMATION OF LITHOGRAPHY FEATURES BY SELF-ASSEMBLY OF BLOCK COPOLYMERS

(71) Applicant: ASML Netherlands B.V., Veldhoven (NL)

(72) Inventors: Sander Frederik Wuister, Eindhoven (NL); Tamara Druzhinina, Eindhoven (NL); Jan Van Male, Leiden (NL); Joanne Klein-Wolterink, Leiden (NL); Davide Ambesi, Breda (NL)

(73) Assignee: ASML NETHERLANDS B.V., Veldhoven (NL)

( * ) Notice: Subject to any disclaimer, the term of this patent is extended or adjusted under 35 U.S.C. 154(b) by 38 days.

(21) Appl. No.: 14/890,867

(22) PCT Filed: May 5, 2014

(86) PCT No.: PCT/EP2014/059097
§ 371 (c)(1),
(2) Date: Nov. 12, 2015

(87) PCT Pub. No.: WO2014/191163
PCT Pub. Date: Dec. 4, 2014

(65) Prior Publication Data
US 2016/0078160 A1    Mar. 17, 2016

Related U.S. Application Data

(60) Provisional application No. 61/829,118, filed on May 30, 2013.

(51) Int. Cl.
*G06F 17/50* (2006.01)
*G06F 7/00* (2006.01)
*G03F 7/00* (2006.01)

(52) U.S. Cl.
CPC ........ *G06F 17/5009* (2013.01); *G03F 7/0002* (2013.01); *G06F 17/5081* (2013.01); *G06F 2217/12* (2013.01)

(58) Field of Classification Search
CPC ............. G06F 15/5009; G06F 15/5081; G06F 7/0002; G06F 2217/12
(Continued)

(56) References Cited

U.S. PATENT DOCUMENTS

2014/0170692 A1\* 6/2014 Krauss .................. B82Y 40/00
435/29
2016/0178999 A1\* 6/2016 Wuister .................... G03F 1/70
716/51

OTHER PUBLICATIONS

Sander F. Wuister et al., "Fundamental study of placement errors in directed self-assembly," J. Micro/Nanolith. MEMS MOEMS, vol. 13, No, 3, pp. 033005-1-033005-9 (Jul.-Sep. 2014).
(Continued)

*Primary Examiner* — Phallaka Kik
(74) *Attorney, Agent, or Firm* — Pillsbury Winthrop Shaw Pittman LLP

(57) ABSTRACT

A method of determining an uncertainty in the position of a domain within a self-assembly block copolymer (BCP) feature. The method includes simulating a BCP feature, calculating a minimum energy position of a first domain within the simulated BCP feature, simulating the application of a potential that causes the position of the first domain to be displaced from the minimum energy position, simulating release of the potential back toward the minimum energy, recording a plurality of energies of the BCP feature during the release and recording at each of the plurality of energies a displacement of the first domain from the minimum energy position, calculating, from the recorded energies and recorded displacements, a probability distribution indicating a probability of the first domain being displaced from the
(Continued)

minimum energy position, and, from the probability distribution, calculating an uncertainty in the position of the first domain within the BCP feature.

23 Claims, 8 Drawing Sheets

(58) Field of Classification Search
USPC ........ 716/136, 30, 54, 51, 55; 703/2, 11, 12, 703/14
See application file for complete search history.

(56) References Cited

OTHER PUBLICATIONS

International Search Report dated Nov. 11, 2014 in corresponding International Patent Application No. PCT/EP2014/059097.
Miri Park et al., "Block Copolymer Lithography: Periodic Arrays of ~$10^{11}$ Holes in 1 Square Centimeter," Science, vol. 276, pp. 1401-1404 (May 30, 1997).
He Yi et al., "Computational simulation of block copolymer directed self-assembly in small topographical guiding templates," Proc. of SPIE, vol. 8680, pp. 86801L-1-86801L-7 (Mar. 26, 2013).
Nabil Laachi et al., "Self-Consistent Field Theory of Directed Self-Assembly in Laterally Confined Lamellae-Forming Diblock Copolymers," Proc. of SPIE, vol. 8323, pp. 83230K-1-83230K-7 (Mar. 1, 2012).
Richard A. Lawson et al., "Development of Realistic Potentials for the Simulation of Directed Self-Assembly of PS-PMMA Di-Block Copolymers," Proc. of SPIE, vol. 7970, pp. 79700N-1-79700N-10 (Apr. 1, 2011).

\* cited by examiner

METHOD OF SIMULATING FORMATION OF LITHOGRAPHY FEATURES BY SELF-ASSEMBLY OF BLOCK COPOLYMERS

CROSS-REFERENCE TO RELATED APPLICATIONS

This application is the U.S. national phase entry of PCT patent application No. PCT/EP2014/059097, which was filed on May 5, 2014, which claims the benefit of priority of U.S. provisional application No. 61/829,118, which was filed on May 30, 2013 and which is incorporated herein in its entirety by reference.

FIELD

The present invention relates to a method of simulating formation of lithography features by self-assembly of block copolymer. The method may be used to determine an uncertainty in the position of a feature formed using block copolymer.

BACKGROUND

In lithography for device manufacture, there is an ongoing desire to reduce the size of features in a lithographic pattern in order to increase the density of features on a given substrate area. Patterns of smaller features having critical dimensions (CD) at nano-scale allow for greater concentrations of device or circuit structures, yielding potential improvements in size reduction and manufacturing costs for electronic and other devices. In projection photolithography, the push for smaller features has resulted in the development of technologies such as immersion lithography and extreme ultraviolet (EUV) lithography.

As an alternative, so-called imprint lithography generally involves the use of a "stamp" (often referred to as an imprint template) to transfer a pattern onto a substrate. An advantage of imprint lithography is that the resolution of the features is not limited by, for example, the emission wavelength of a radiation source or the numerical aperture of a projection system. Instead, the resolution is mainly limited to the pattern density on the imprint template.

For both projection photolithography and for imprint lithography, it is desirable to provide high resolution patterning of surfaces, for example of an imprint template or of other substrates. The use of self-assembly of a block copolymers (BCP) has been considered as a potential method for increasing the feature resolution to a smaller dimension than that obtainable by prior lithography methods or as an alternative to electron beam lithography for preparation of imprint templates.

A self-assemblable BCP is a compound useful in nanofabrication because it may undergo an order-disorder transition on cooling below a certain temperature (order-disorder transition temperature To/d) resulting in phase separation of copolymer blocks of different chemical nature to form ordered, chemically distinct domains with dimensions of tens of nanometers or even less than 10 nm. The size and shape of the domains may be controlled by manipulating the molecular weight and composition of the different block types of the copolymer. The interfaces between the domains may have a line width roughness of the order of about 1-5 nm and may be manipulated by modification of the chemical compositions of the blocks of the copolymer.

The feasibility of using a thin film of BCP as a self-assembling template was demonstrated by Chaikin and Register, et al., Science 276, 1401 (1997). Dense arrays of dots and holes with dimensions of 20 nm were transferred from a thin film of poly(styrene-block-isoprene) to a silicon nitride substrate.

A BCP comprises different blocks, each typically comprising one or more identical monomers, and arranged side-by side along the polymer chain. Each block may contain many monomers of its respective type. So, for instance, an A-B BCP may have a plurality of type A monomers in the (or each) A block and a plurality of type B monomers in the (or each) B block. An example of a suitable BCP is, for instance, a polymer having covalently linked blocks of polystyrene (PS) monomer (hydrophobic block) and polymethylmethacrylate (PMMA) monomer (hydrophilic block). Other BCPs with blocks of differing hydrophobicity/hydrophilicity may be useful. For instance a tri-block copolymer such as (A-B-C) BCP may be useful, as may an alternating or periodic BCP e.g. $[-A-B-A-B-A-B-]_n$ or $[-A-B-C-A-B-C]_m$ where n and m are integers. The blocks may be connected to each other by covalent links in a linear or branched fashion (e.g., a star or branched configuration).

A BCP may form many different phases upon self-assembly, dependent upon the volume fractions of the blocks, degree of polymerization within each block type (i.e. number of monomers of each respective type within each respective block), and the optional use of a solvent and surface interactions. When applied in a thin film, geometric confinement may pose additional boundary conditions that may limit the phases formed. In general, spherical (e.g. cubic), cylindrical (e.g. tetragonal or hexagonal) and lamellar phases (i.e. self-assembled phases with cubic, hexagonal or lamellar space-filling symmetry) are practically observed in thin films of self-assembled BCPs.

The phase type observed may depend upon the relative molecular volume fractions of the different polymer blocks. For instance, a molecular volume ratio of 80:20 will provide a cubic phase of discontinuous spherical domains of the low volume block arranged in a continuous domain of the higher volume block. As the volume ratio reduces to 70:30, a cylindrical phase will be formed with the discontinuous domains being cylinders of the lower volume block. At a 50:50 ratio, a lamellar phase is formed. With a ratio of 30:70 an inverted cylindrical phase may be formed and at a ratio of 20:80, an inverted cubic phase may be formed.

Suitable BCPs for use as a self-assemblable polymer include, but are not limited to, poly(styrene-b-methylmethacrylate), poly(styrene-b-2-vinylpyridone), poly(styrene-b-butadiene), poly(styrene-b-ferrocenyldimethylsilane), poly(styrene-b-ethyleneoxide), poly(ethyleneoxide-b-isoprene). The symbol "b" signifies "block". Although these are di-block copolymer examples, it will be apparent that self-assembly may also employ a tri-block, tetra-block or other multi-block copolymer.

One method used to guide or direct self-assembly of a polymer (such as a BCP) onto a substrate surface is known as graphoepitaxy. This method involves the self-organization of a BCP guided by topological pre-patterning on the substrate using one or more features constructed of resist (or one or more features transferred from resist onto a substrate surface, or one or more features transferred onto a film stack deposited on the substrate surface). The pre-patterning is used to form an enclosure or "recess" comprising a substrate base and a sidewall, e.g., a pair of opposing side-walls, of resist (or a side-wall formed in a film or a side-wall formed in the substrate).

Typically, the height of a feature of a graphoepitaxy template is of the order of the thickness of the BCP layer to be ordered, so may be, for instance, from about 20 nm to about 150 nm.

A lamellar self-assembled BCP can form a parallel linear pattern of lithography features with adjacent lines of the different polymer block domains in the recesses. For instance if the BCP is a di-block copolymer with A and B blocks within the polymer chain, the BCP may self-assemble into an ordered layer in each recess, the layer comprising regularly spaced first domains of A blocks, alternating with second domains of B blocks.

Similarly, a cylindrical self-assembled BCP can form an ordered pattern of lithography features comprising cylindrical discontinuous first domains surrounded by a second continuous domain. For instance, if the BCP is a di-block copolymer with A and B blocks within the polymer chain, the A block may assemble into a cylindrical discontinuous domain within a circular recess and surrounded by a continuous domain of B block. Alternatively, the A block may assemble into cylindrical discontinuous domains regularly spaced across a linear recess and surrounded by a continuous domain of B block.

Graphoepitaxy may be used, therefore, to guide the self-organization of lamellar or cylindrical phases such that the BCP pattern subdivides the spacing of the side wall(s) of a recess into domains of discrete copolymer patterns.

In a process to implement the use of BCP self-assembly in nanofabrication, a substrate may be modified with a neutral orientation control layer, as part of the graphoepitaxy template, to induce the preferred orientation of the self-assembly pattern in relation to the substrate. For some BCPs used in self-assemblable polymer layers, there may be a preferential interaction between one of the blocks and the substrate surface that may result in orientation. For instance, for a polystyrene(PS)-b-PMMA BCP, the PMMA block will preferentially wet (i.e. have a high chemical affinity with) an oxide surface and this may be used to induce the self-assembled pattern to lie oriented substantially parallel to the plane of the surface. Substantially normal orientation may be induced, for instance, by depositing a neutral orientation layer onto the surface rendering the substrate surface neutral to both blocks, in other words the neutral orientation layer has a similar chemical affinity for each block, such that both blocks wet the neutral orientation layer at the surface in a similar manner. By "normal orientation" it is meant that the domains of each block will be positioned side-by-side at the substrate surface, with the interfacial regions between adjacent domains of different blocks lying substantially perpendicular to the plane of the surface.

In a graphoepitaxy template for aligning a di-block copolymer having A and B blocks, where A is hydrophilic and B is hydrophobic in nature, the graphoepitaxy pattern may comprise hydrophobic resist side-wall features, with a neutral orientation base between the hydrophobic resist features. The B domain may preferentially assemble alongside the hydrophobic resist features, with several alternating domains of A and B blocks aligned over the neutral orientation region between the pinning resist features of the graphoepitaxy template.

A neutral orientation layer may, for instance, be created by use of random copolymer brushes which are covalently linked to the substrate by reaction of a hydroxyl terminal group, or some other reactive end group, to oxide at the substrate surface. In other arrangements for neutral orientation layer formation, a crosslinkable random copolymer or an appropriate silane (i.e. molecules with a substituted reactive silane, such as a (tri)chlorosilane or (tri)methoxysilane, also known as silyl, end group) may be used to render a surface neutral by acting as an intermediate layer between the substrate surface and the layer of self-assemblable polymer. Such a silane based neutral orientation layer will typically be present as a monolayer whereas a crosslinkable polymer is typically not present as a monolayer and may have a layer thickness of typically less than or equal to about 40 nm, or less than or equal to about 20 nm.

A thin layer of self-assemblable BCP may be deposited onto a substrate having a graphoepitaxy template as set out above. A suitable method for deposition of the self-assemblable polymer is spin-coating, as this process is capable of providing a well-defined, uniform, thin layer of self-assemblable polymer. A suitable layer thickness for a deposited self-assemblable polymer film is approximately 10 nm to 150 nm.

Following deposition of the BCP film, the film may still be disordered or only partially ordered and one or more additional steps may be needed to promote and/or complete self-assembly. For instance, the self-assemblable polymer may be deposited as a solution in a solvent, with solvent removal, for instance by evaporation, prior to self-assembly.

Self-assembly of a BCP is a process where the assembly of many small components (the BCP) results in the formation of a larger more complex structure (the nanometer sized features in the self-assembled pattern). Defects arise naturally from the physics controlling the self-assembly of the polymer. Self-assembly is driven by the differences in interactions (i.e. differences in mutual chemical affinity) between A/A, B/B and A/B (or B/A) block pairs of an A-B BCP, with the driving force for phase separation described by Flory-Huggins theory for the system under consideration. The use of graphoepitaxy may greatly reduce defect formation. The Flory-Huggins interaction parameter (chi value), and the degree of polymerization of the BCP blocks (N value) are parameters of the BCP which affect the phase separation, and the dimensions with which self-assembly of a particular BCP occurs.

For a polymer which undergoes self-assembly, the self-assemblable polymer will exhibit an order-disorder temperature To/d. To/d may be measured by any suitable technique for assessing the ordered/disordered state of the polymer, such as differential scanning calorimetry (DSC). If layer formation takes place below this temperature, the molecules will be driven to self-assemble. Above the temperature To/d, a disordered layer will be formed with the entropy contribution from disordered A/B domains outweighing the enthalpy contribution arising from favorable interactions between neighboring A-A and B-B block pairs in the layer. The self-assemblable polymer may also exhibit a glass transition temperature Tg below which the polymer is effectively immobilized and above which the copolymer molecules may still reorient within a layer relative to neighboring copolymer molecules. The glass transition temperature is suitably measured by differential scanning calorimetry (DSC).

Defects formed during ordering as set out above may be partly removed by annealing. A defect such as a disclination (which is a line defect in which rotational symmetry is violated, e.g. where there is a defect in the orientation of a director) may be annihilated by pairing with other another defect or disclination of opposite sign. Chain mobility of the self-assemblable polymer may be a factor for determining defect migration and annihilation and so annealing may be carried out at a temperature where chain mobility is high but the self-assembled ordered pattern is not lost. This implies temperatures up to a few ° C. above or below the order/disorder temperature To/d for the polymer.

Ordering and defect annihilation may be combined into a single annealing process or a plurality of processes may be used in order to provide a layer of self-assembled polymer such as BCP, having an ordered pattern of domains of differing chemical type (of domains of different block types).

In order to transfer a pattern, such as a device architecture or topology, from the self-assembled polymer layer into the substrate upon which the self-assembled polymer is deposited, typically a first domain type will be removed by so-called breakthrough etching to provide a pattern of a second domain type on the surface of the substrate with the substrate laid bare between the features of the second domain type. A pattern having parallel cylindrical phase domains can be etched using a dry etching or reactive ion etching technique. A pattern having lamellar phase domains can utilize a wet etching technique in addition to or as an alternative to those suitable for the etching of parallel cylindrical phase domains.

Following the breakthrough etching, the pattern may be transferred by so-called transfer etching using an etching means which is resisted by the second domain type and so forms recesses in the substrate surface where the surface has been laid bare.

SUMMARY

It is an object of the invention to, for example, obviate or mitigate a disadvantage associated with the art.

According to an aspect, there is provided a method of determining an uncertainty in the position of a domain within a self-assembly block copolymer feature, the method comprising: simulating a block copolymer feature, wherein the simulated block copolymer feature comprises a first domain comprising a first polymer type and a second domain comprising a second polymer type; calculating a minimum energy position of the first domain within the simulated block copolymer feature, wherein the minimum energy position is the position of the first domain at a first energy state of the block copolymer feature, the first energy state being substantially at a minimum energy; simulating the application of a potential to the block copolymer feature, wherein the potential causes the position of the first domain to be displaced from the minimum energy position; simulating release of the potential, thereby allowing the energy of the block copolymer feature to relax to substantially the minimum energy; recording a plurality of energies of the block copolymer feature as the block copolymer feature relaxes to substantially the minimum energy; recording at each of the plurality of energies a displacement of the first domain from the minimum energy position; calculating, from the recorded energies of the block copolymer feature and the recorded displacements of the first domain, a probability distribution indicating a probability of the first domain being displaced from the minimum energy position; and calculating, from the probability distribution, an uncertainty in the position of the first domain within the block copolymer feature.

In this way, a useful indication of an uncertainty in the position of the first domain within the block copolymer feature may be obtained. The uncertainty may then be used in the design, and/or manufacture, of a patterned substrate, component or device. In particular, an indication of the uncertainty allows for more confidence in the placement of a feature on a substrate.

According to an aspect, there is provided a method of forming a pattern of features on a substrate with the use of a self-assembly block copolymer, the method comprising: simulating a block copolymer feature, wherein the simulated block copolymer feature comprises a first domain comprising a first polymer type and a second domain comprising a second polymer type; calculating a minimum energy position of the first domain within the simulated block copolymer feature, wherein the minimum energy position is the position of the first domain at a first energy state of the block copolymer feature, the first energy state being substantially a minimum energy; simulating the application of a potential to the block copolymer feature, wherein the potential causes the position of the first domain to be displaced from the minimum energy position; simulating release of the potential, thereby allowing the energy of the block copolymer feature to relax to substantially the minimum energy; recording a plurality of energies of the block copolymer feature as the block copolymer feature relaxes to substantially the minimum energy; recording at each of the plurality of energies a displacement of the first domain from the minimum energy position; calculating, from the recorded energies of the block copolymer feature and the recorded displacements of the first domain, a probability distribution indicating a probability of the first domain being displaced from the minimum energy position; calculating, from the probability distribution, an uncertainty in the position of the first domain within the block copolymer feature; using the uncertainty in the position of the first domain within the self-assembly block copolymer feature to design a component; and forming the pattern of features on the substrate according to the design.

In this way a pattern of features may be manufactured taking into account the uncertainty in position of the first domain within the block copolymer feature.

Any of the aspects of the invention may comprise one or more of the optional features described below.

The first domain may be surrounded by the second domain.

The method may further comprise determining, from the uncertainty in the position of the first domain within the block copolymer feature, an uncertainty in the position of the first domain on a substrate.

In this way additional information is provided for use in the design and/or manufacture of a substrate, component or device.

Simulating the application of a potential may comprise simulating an increase in a chemical potential of the block copolymer feature.

Calculating the probability distribution may comprise assuming a Boltzmann distribution of energies of the block copolymer feature.

Calculating the uncertainty in the position of the first domain within the block copolymer feature may comprise fitting a Gaussian distribution to the probability distribution.

Calculating the uncertainty in the position of the first domain within the block copolymer feature may further comprise calculating a standard deviation of the Gaussian distribution.

The block copolymer feature may be cylindrical. The first domain may be cylindrical. The block copolymer feature, and/or the first domain may be another shape, and may be, for example, spherical, elliptical, rectangular and/or lamellar.

The minimum energy position may be substantially at the geometric center of the block copolymer feature.

The block copolymer feature may have a width (e.g., diameter) of between 20 and 100 nanometers. The first domain may have a width (e.g., diameter) of between 5 and 50 nanometers.

The method may further comprise using the calculated uncertainty in the position of the first domain within the block copolymer feature to design a pattern of recesses for pre-patterning a substrate.

The method may further comprise using the calculated uncertainty in the position of the first domain on a substrate to design a pattern of recesses for pre-patterning a substrate.

Designing the pattern of recesses for pre-patterning a substrate may comprise simulating a lithographic process.

The method may further comprise pre-patterning a substrate based on the designed pattern of recesses. For example, the design may be used to imprint a plurality recesses onto a substrate, the recesses being suitable for receipt of a block copolymer for use in a self-assembly block copolymer manufacturing method.

The method may further comprise designing a component for manufacture using a self-assembly block copolymer based upon the calculated uncertainty in the position of the first domain within the block copolymer feature.

The component may comprise, for example, a patterned substrate, a device architecture or topology, etc.

The method may further comprise forming a pattern of features which comprises the component on a substrate according to the design using a self-assembly block copolymer. The method may further comprise one or more additional steps such as breakthrough etching (e.g. to remove the first or second domain) and/or transfer etching.

According to an aspect, there is provided a computer program comprising computer readable instructions configured to cause a computer to carry out a method as described herein.

According to an aspect, there is provided a computer readable medium carrying a computer program as described herein.

According to an aspect, there is provided an apparatus comprising a memory storing processor readable instructions, and a processor arranged to read and execute instructions stored in the memory, wherein the processor readable instructions comprise instructions arranged to control the computer to carry out a method as described herein.

One or more aspects of the invention may, where appropriate to one skilled in the art, be combined with any one or more other aspects described herein, and/or with any one or more features described herein.

BRIEF DESCRIPTION OF THE DRAWINGS

Specific embodiments of the invention will be described with reference to the accompanying Figures, in which.

DETAILED DESCRIPTION

Figure 1A:
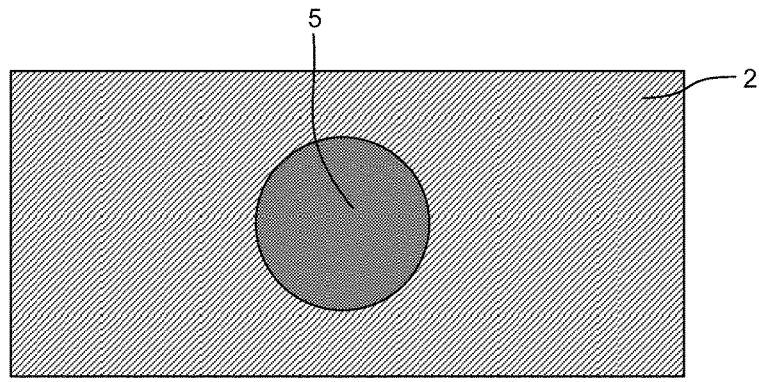
FIGS. 1A-1E schematically depict directed self-assembly of A-B block copolymer onto a substrate by graphoepitaxy.
Figure 1B:
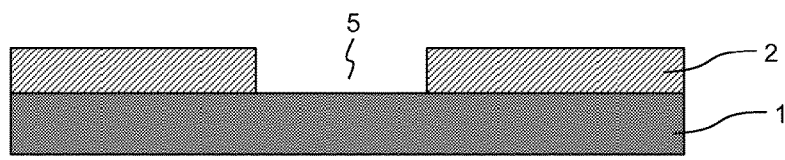

FIGS. 1A and 1B show, in plan view and cross-section respectively, part of a substrate 1 to which a lithography process using self-assembly of BCP is applied. An anti-reflection coating may be present on the surface of the substrate 1. The anti-reflection coating (if present) may be an organic material, such as, for example, ARC 29, from Brewer Science Inc. of Rolla, Mo. The anti-reflection coating may be an inorganic material such as, for example, SiC or SiON. A neutral layer may be provided on the anti-reflection coating. A layer of resist 2 is applied to the substrate 1. The layer of resist 2 may, for example, be a photo-resist. The layer of resist 2 is patterned with a contact hole resist recess 5. The contact hole resist recess 5 may be formed by photolithography, imprint lithography or another lithographic process.

Figure 1C:
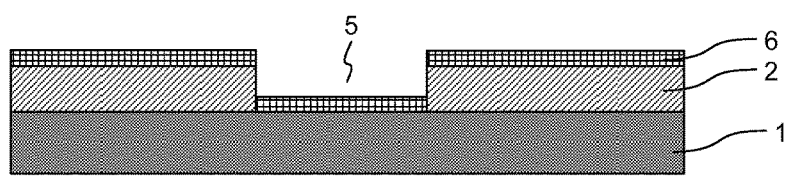
Figure 1D:
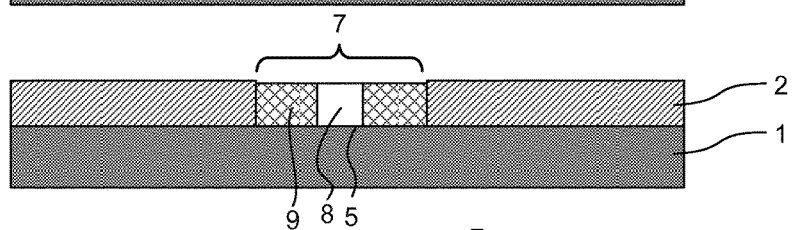
Figure 1E:
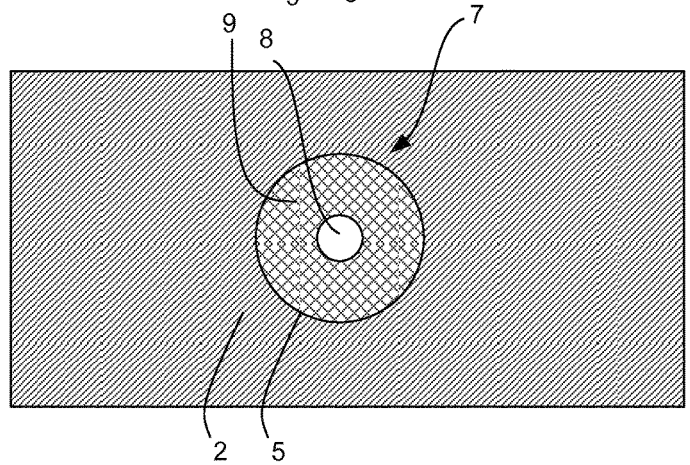

In FIG. 1C, a BCP layer 6 has been deposited onto the substrate 1 and the resist 2. The BCP layer 6 is shown with a uniform thickness within the resist recess 5, and on top of the resist 2. In FIGS. 1D and 1E, which show cross-section and plan views respectively, the BCP layer 6 has been thermally annealed (thereby causing self-assembly of the BCP material to occur). The thermal annealing process causes a redistribution of the BCP material, with the BCP material being transported from a region above resist 2 into the resist recess 5. For simplicity all of the BCP material has been depicted as being transported into the resist recess 5. However it will be appreciated that in practice some BCP material may remain in the region above the resist 2. Solvent annealing may be used instead of thermal annealing (a solvent swells a block copolymer thereby increasing its mobility such that rearrangement of the block copolymer is possible).

The use of a BCP material allows domains of component polymer material to be self-assembled within a BCP feature. For example, the BCP deposited within the resist recess 5 can be seen to have formed distinct domains of polymer. A type A polymer domain 8 is formed as, for example, a cylinder and is surrounded by a continuous type B polymer domain 9. The type A polymer domain 8 and the type B polymer domain 9 form a BCP feature 7 within the resist recess 5.

As noted above, a neutral orientation layer may be provided on the substrate. The neutral orientation layer may have a similar chemical affinity for the type A polymer block and the type B polymer block, such that both blocks wet the neutral orientation layer in a similar manner. This may promote domains of type A and B polymers to form which have a normal orientation (i.e. substantially perpendicular to the surface of the substrate). The neutral orientation layer may have a surface energy which is greater than a surface energy of one of the two polymer domains 8 and 9 and less than a surface energy of the other of the two polymer domains 8 and 9.

To guide the self-assembly, a lateral dimension is controlled by the spacing of one or more resist walls. The width (e.g., diameter) of the resist recess 5 may, for example, be approximately 70 nanometers. The width of the resist recess 5 may, for example, be in the range of between approximately 20 nanometers and approximately 100 nanometers. The width (e.g., diameter) of the type A polymer domain 8 inside the resist recess 5 may, for example, be approximately 30 nanometers. The width (e.g., diameter) of the type A polymer domain 8 inside the resist recess 5 may, for example, be in the range of between approximately 5 nanometers and approximately 50 nanometers.

The BCP material thickness also influences the self-assembly process. The thickness of the BCP layer within the resist recess 5 may be optimized for the formation of distinct domains of type A and type B polymer.

Figure 2:
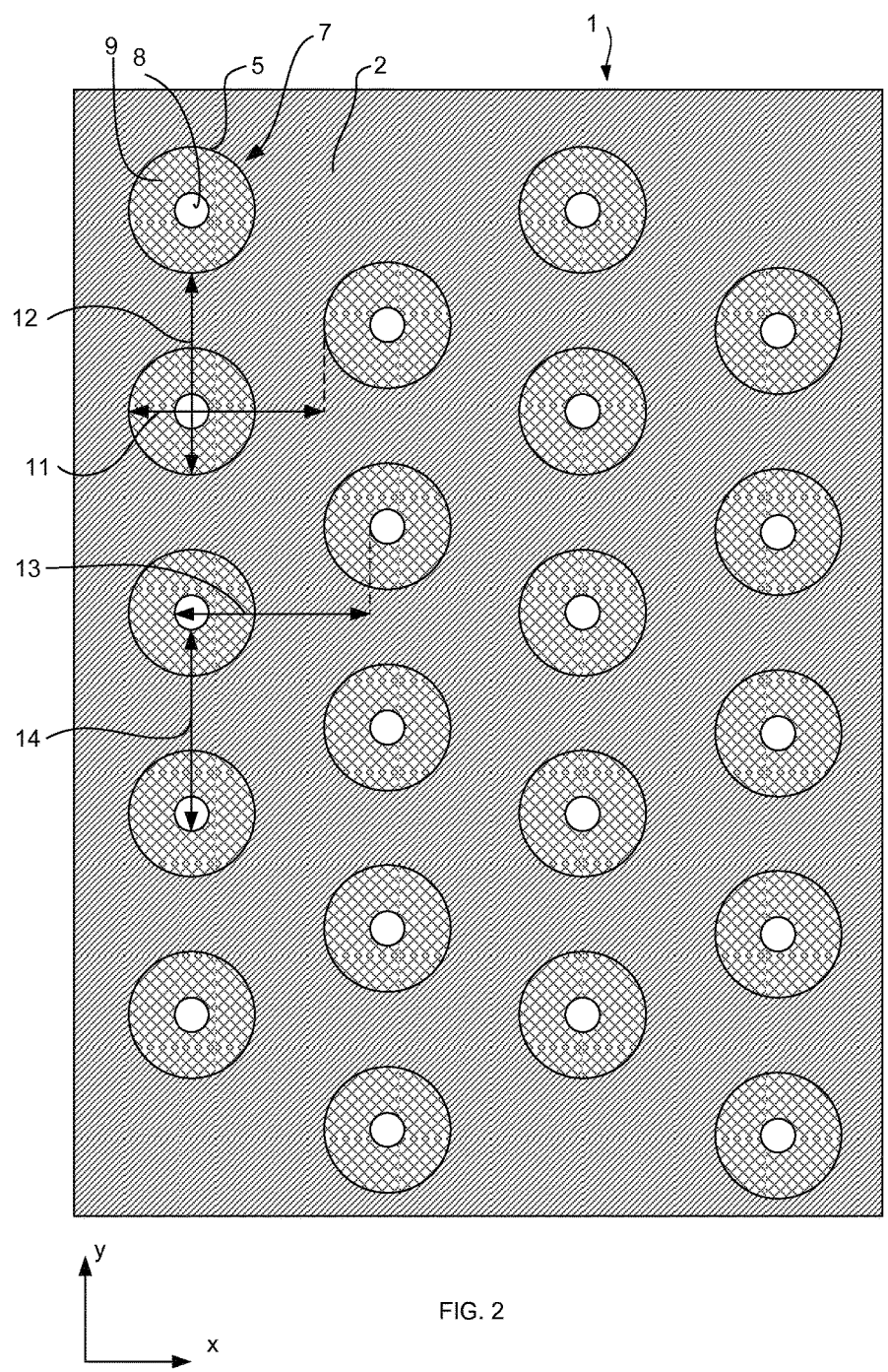
FIG. 2 schematically depicts a plurality of A-B block copolymer features on a substrate.

A plurality of BCP features 7 may be formed on a single substrate 1. For example, a formation of a plurality of cylindrical BCP features (such as the cylindrical BCP feature 7 depicted in FIG. 1), may be formed on a substrate 1. FIG. 2 schematically depicts in plan view a larger part of the substrate 1 to which a lithography process using self-assembly of BCP has been applied. A layer of resist 2 is applied to the substrate 1. The layer of resist 2 is patterned with a plurality of resist recesses 5. A BCP layer is deposited onto the substrate 1 and a thermal annealing process applied to the BCP layer. A respective BCP feature 7 is formed within each of the resist recesses 5. The BCP features 7 each comprise a type A polymer domain 8 and a type B polymer domain 9. The type A polymer domain 8 is formed as, for example, a cylinder and is surrounded by the continuous type B polymer domain 9. The type A polymer domain 8 may, for example, comprise blocks of polymethylmethacrylate (PMMA) monomer. The type B polymer domain 9 may, for example, comprise blocks of polystyrene (PS) monomer.

The BCP feature 7 may further comprise a second type A polymer domain (e.g. blocks of PMMA monomer) positioned around the periphery of the type B polymer domain 9. The second type A polymer domain may, for example, be in contact with the wall(s) of the resist recess 5. For simplicity the second type A polymer domain is not depicted in the Figures, however it will be appreciated that one or more additional polymer domains other than those depicted may be present in any given BCP feature 7.

The BCP features 7 are positioned at substantially regular intervals in both an x and a y direction. The separation and size of the BCP features 7 determine a pitch between BCP features 7. The pitch is defined as the width of one repeat unit of a BCP feature 7 (i.e. feature width plus inter-feature spacing). An x-pitch 11 and a y-pitch 12 between BCP features 7 are depicted in FIG. 2. An x-pitch 13 and a y-pitch 14 between type A polymer domains 8 are also depicted. The position and pitch of the type A polymer domains are a function of the position and pitch of the resist recesses 5 and of the position of the type A polymer domains within the BCP features 7.

The accuracy with which a type A polymer domain is positioned on the substrate is a significant factor in the manufacturing of a device using self-assembly block copolymer. For example a device may be manufactured by patterning a first plurality of features onto the substrate 1. The first plurality of features may, for example, correspond with the type A polymer domains 8 depicted in FIG. 2. This may be achieved, for example, by exposing the resist 2, the type A polymer domains 8 and the type B polymer domains 9 to an etching process. The etching process may remove the type A polymer domains 8. The etching process therefore exposes regions of the substrate 1 below the type A polymer domains 8. The resist 2 and the type B polymer domains 9 may be resistant to the etching process and may remain in place. A further etch process may be performed to etch the exposed regions of the substrate, thereby patterning features into the substrate which correspond with the type A polymer domains 8. These features may for example form contact holes of an integrated circuit.

The resist 2 and the type B polymer domains 9 may subsequently be removed from the substrate and a new layer of resist 2 may be deposited onto the substrate 1. A second plurality of features may then be patterned onto the substrate 1 by forming a second plurality of resist recesses 5 in the new layer of resist 2. A BCP layer 6 may then be deposited onto the substrate 1 and exposed to an annealing process, thereby forming a second plurality of BCP features 7 comprising a second plurality of type A polymer domains 8. One or more etching processes may then be performed to pattern a second plurality of features onto the substrate 1. The second plurality of features correspond to the second plurality of type A polymer domains 8.

When manufacturing a device using BCP, it is desirable, for example, that the first plurality of features is accurately aligned relative to the second plurality of features. The accuracy of the alignment of the first plurality of features relative to the second plurality of features is dependent on the uncertainty associated with the positioning of a type A polymer domain 8 on the substrate 1. This uncertainty may limit the minimum feature size and pitch separation achievable when manufacturing a device. For example, a decrease in the uncertainty associated with the positioning of a type A polymer domain 8 on the substrate 1 may allow smaller features to be patterned onto the substrate 1. Additionally or alternatively, a decrease in the uncertainty may allow features to be patterned onto a substrate with a smaller feature pitch separation. It is therefore desirable for the design and manufacture of a device using BCP to calculate the uncertainty associated with positioning of a type A polymer domain.

In general, a device may be manufactured using other methods and features than those described above. For example a BCP feature having another shape and/or configuration than the uniformly arranged cylindrical shapes depicted in FIGS. 1 and 2 may be patterned onto a substrate.

The uncertainty $\sigma^A$ associated with the positioning of a type A polymer domain 8 on the substrate 1 is a combination of the uncertainty $\sigma_{lith}$ associated with the positioning of one or more of the resist recesses 5 and the uncertainty $\sigma_{DSA}$ associated with the positioning of the one or more type A polymer domains 8 within a BCP feature 7. The uncertainty $\sigma_{lith}$ in the positioning of the resist recess 5 is due to uncertainty in the lithographic process used to form the resist recess 5. The uncertainty $\sigma_{DSA}$ in the positioning of a type A polymer domain 8 within a BCP feature 7 is due to uncertainty in the directed self-assembly process. The combined uncertainty $\sigma_A$ is given by equation 1.

$$\sigma_A = \sqrt{\sigma_{DSA} + \sigma_{lith}} \quad (1)$$

In lithographic applications the value $3\sigma_A$ may be used in the design of a device manufactured using self-assembly block copolymer (it may be assumed that almost all features will fall within $3\sigma_A$ of their desired position). The uncertainty $\sigma_{lith}$ may be well known for the lithographic process which is employed to form the resist recess 5. However, the uncertainty $\sigma_{DSA}$ may be dependent on a number of different variables. For example, the uncertainty $\sigma_{DSA}$ may depend on the size and shape of a resist recess 5, the type A monomer used, the type B monomer used and the ratio of the quantity of type A monomer to type B monomer in the BCP material. The uncertainty $\sigma_{DSA}$ may, for example, be approximately 2 nanometers.

The uncertainty $\sigma_{DDA}$ may be determined through experimentation. For example a plurality of BCP features 7 may be formed on a substrate 1. The position of the type A polymer domains within the plurality of BCP features 7 may then be measured for each of the plurality of BCP features 7. The measured positions may be used to calculate $\sigma_{DSA}$ using known statistical methods. However it may be time consuming to experimentally determine the uncertainty $\sigma_{DSA}$ for multiple combinations of the variables on which $\sigma_{DSA}$ depends. It is therefore desirable to provide a method for computing the uncertainty $\sigma_{DSA}$ without the need for experimentation. A method for computing the uncertainty $\sigma_{DSA}$ may be used in the design and/or manufacture of a device using self-assemblable BCP.

The uncertainty $\sigma_{DSA}$ may be determined through simulating a BCP feature. A BCP feature may be simulated using software implemented on a computer. For example the Dynamic Density Functional Theory (DDFT) software package sold by Chemistry Unified Language Interface (CULGI B.V. of Leiden, the Netherlands) may be used to simulate a BCP feature. In general any software utilizing a thermodynamic theory based on self-consistent field theory (SCFT) may be used to simulate a BCP feature. The behavior of a BCP feature 7 may be subject to a large number of interacting molecules. A BCP feature 7 may however be simulated as a thermodynamic system and the macroscopic properties of the BCP feature may be determined through statistical mechanics.

Figure 3A:
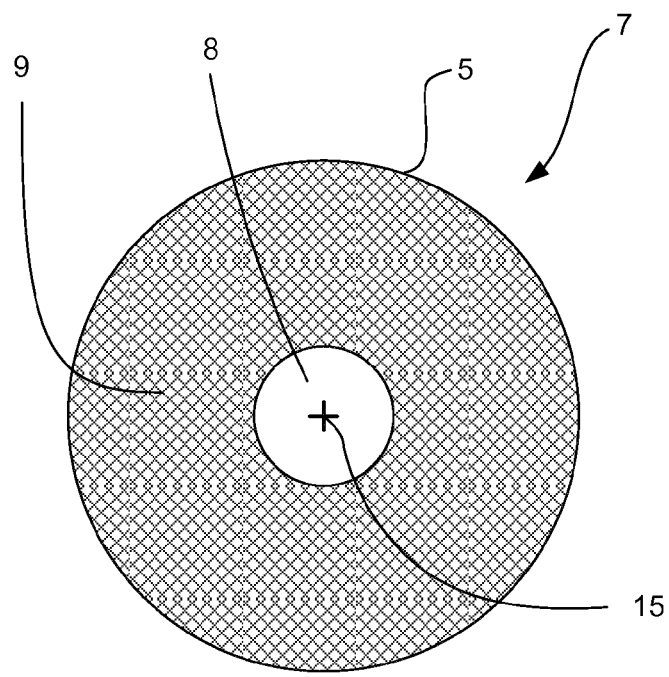
FIGS. 3A and 3B schematically depict an A-B block copolymer feature, wherein the position of a polymer domain is controlled by applying a potential to the feature.

FIG. 3A schematically depicts a BCP feature 7 formed inside a resist recess 5. The BCP feature 7 comprises a type A polymer domain 8 and a type B polymer domain 9. The type A polymer domain 8 is formed as a cylinder and is surrounded by the continuous type B polymer domain 9. The type A polymer may preferentially assemble substantially towards the geometric center 15 of the resist recess 5. The type B polymer may preferentially assemble so as to surround the type A polymer domain 8. As was described above, the BCP feature 7 may further comprise a second type A polymer domain which surrounds the type B polymer domain and preferentially assembles alongside the boundary of the resist recess 5 (the second type A polymer domain is omitted from FIG. 3A). The BCP feature 7 may further comprise one or more further polymer domains which may be type A polymer domain, type B polymer domain or other type polymer domain (e.g. type C polymer domain).

The position of the type A domain 8 within the type B domain 9, depicted in FIG. 3A is the position which the type A domain 8 tends to when the BCP feature relaxes into a minimum energy state. This state may equivalently be considered as a state which minimizes the Gibbs free energy of the BCP feature and is therefore a state of thermodynamic equilibrium.

Although the type A polymer preferentially assembles substantially towards the geometric center 15 of the resist recess 5, the BCP feature 7 may take up an energy state other than the minimum energy state. In an energy state other than the minimum energy state, the type A polymer domain may assemble at a position which is displaced from the center 15 of the resist recess 5. Put differently there is a non-zero probability that the type A polymer domain may assemble at a position which is displaced from the center 15 of the resist recess 5. The probability of the type A polymer domain 8 to assemble at a displaced position may be represented by a distribution of the probability that the type A polymer domain 8 will assemble at different displacements from the center 15 of the resist recess 5. This may be referred to as a probability distribution of the displacement of the type A polymer domain 8. This probability distribution may be used to calculate the uncertainty $\sigma_{DSA}$.

Figure 4:
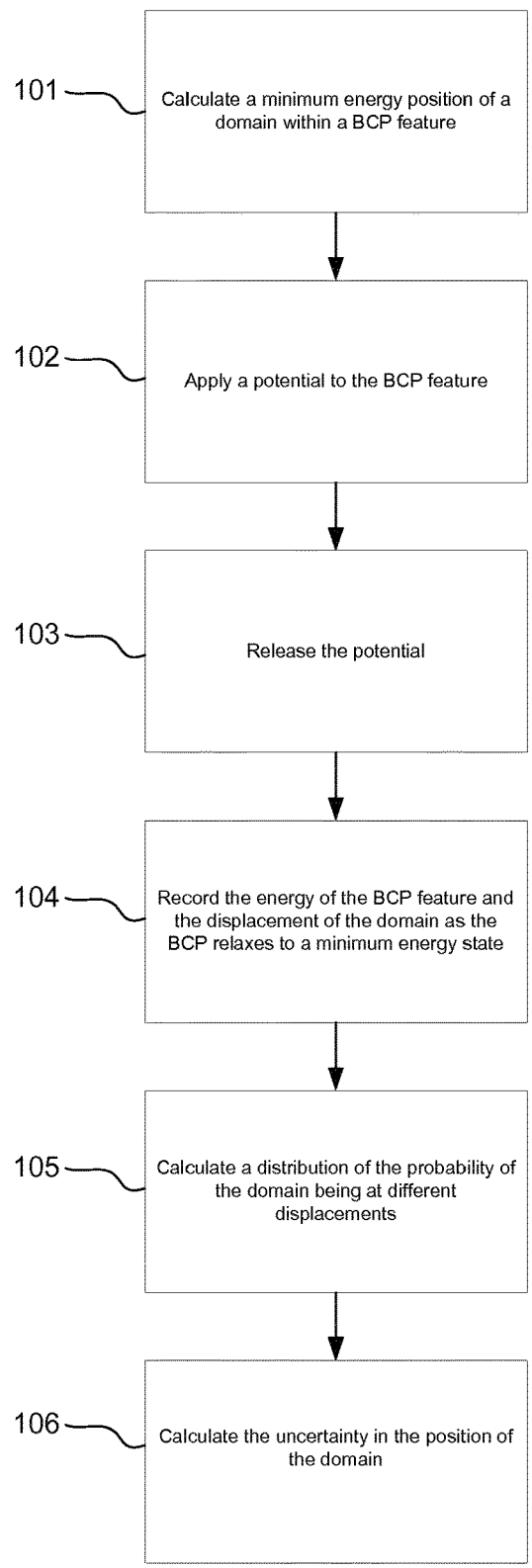
FIG. 4 is a flow diagram of a method of determining an uncertainty in the position of the polymer domain of FIG. 3 within a block copolymer feature.

A method for calculating the uncertainty $\sigma_{DSA}$ in the position of a type A polymer domain within a BCP feature is depicted in the flowchart of FIG. 4. The BCP feature is simulated using software implemented on a computer (e.g. DDFT software package referred to above). At step 101 a minimum energy position of the type A polymer domain 8 is calculated. The minimum energy position is the position of the type A polymer domain 8 at an energy state of the BCP feature 7 which is substantially a minimum energy state. At the minimum energy state the BCP feature 7 is in thermodynamic equilibrium. The minimum energy position may, for example, be at the geometric center of the BCP feature 7. The simulation of the BCP feature 7 may be designed to minimize the energy of the BCP feature 7. The minimum energy position is therefore found by allowing the simulation to minimize the energy of the BCP feature 7 and recording the position of the type A polymer domain 8, within the BCP feature 7, once the energy is minimized.

At step 102 a potential is applied to the simulation of the BCP feature 7. The potential may, for example, comprise an increase in the chemical potential of the BCP feature. The simulation may have an intrinsic chemical potential associated with the BCP feature 7. The potential may be applied by increasing the intrinsic chemical potential in the simulation. The chemical potential may be increased at a specific position in the simulated BCP feature 7. This may attract the type A polymer domain 8 towards the position at which the potential is applied (e.g. the position at which the chemical potential is increased). This results in a displacement of the type A polymer domain 8 from the minimum energy position. The displacement of the type A polymer domain 8 may be a lateral displacement, i.e. the polymer domain 8 may only be displaced in an x and/or y direction and may not be displaced in a direction towards or away from the substrate 1.

In general terms, while software exists to simulate BCP features such as the simulated BCP feature 7, such simulation software would, by default, simulate BCP features with a minimum energy. As such, for a simulated BCP feature 7, such software would position the type A polymer domain 8 in the minimum energy position. Applying a potential to the simulation of the BCP feature 7 perturbs the simulation from its default state and causes a displacement of the type A polymer domain 8 from the minimum energy position.

Figure 3B:
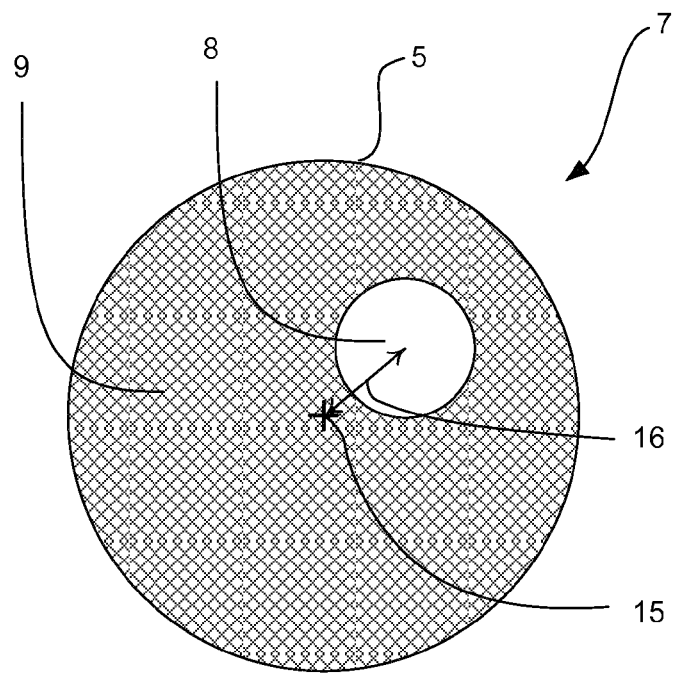

FIG. 3B schematically depicts a BCP feature 7 formed inside a resist recess 5 after a potential is applied to the BCP feature 7. The potential applied to the BCP feature 7 results in a displacement 16 of the type A domain from the center 15 of the BCP feature 7. The potential applied to the BCP feature also causes the energy of the BCP feature 7 to increase, thus disturbing the BCP feature from thermodynamic equilibrium.

At step 103 of FIG. 4, the potential is released from the simulated BCP feature 7. Releasing the potential allows the simulation of the BCP feature 7 to return to its default state and thus the BCP feature 7 relaxes to thermodynamic equilibrium and returns to the minimum energy state. The simulation of the BCP feature 7 may return to the minimum energy state in a series of iterations. For each iteration the energy is reduced by a small amount and the position of the type A polymer domain 8 for that energy is calculated.

At step 104 a plurality of energies of the BCP feature 7 are recorded as the BCP feature 7 relaxes to the minimum energy state. The energies may be recorded as an energy difference ΔE from the minimum energy state. The energy difference may be scaled by the factor kT, where k is the Boltzmann constant and T is the temperature of the BCP feature 7. The scaled energy difference ΔE/kT may therefore be recorded. The displacement of the type A polymer domain 8 from the minimum energy position is also recorded at each of the plurality of energies of the BCP feature 7.

The output of the DDFT software package may be images which show the BCP feature. The displacement of the type A polymer domain 8 from the minimum energy position may be measured by capturing and analyzing images output from the DDFT software package. This may be done using any suitable image analysis software.

Figure 5:
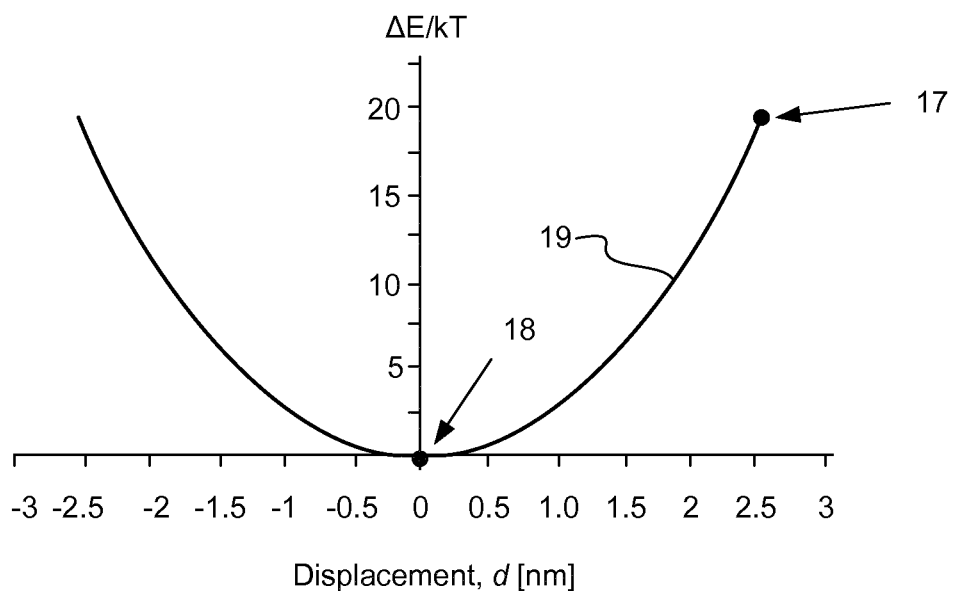
FIG. 5 is a schematic graph of the energy of the block copolymer feature depicted in FIG. 2 as a function of the displacement of the polymer domain.

FIG. 5 is a schematic graph of the scaled differences in energy ΔE/kT from the minimum energy state of the BCP feature 7 as a function of the displacement of the type A polymer domain 8 from the minimum energy position. Point 17 of FIG. 5 represents the BCP feature 7 in a state at which the type A polymer domain 8 is displaced from the minimum energy position. Point 18 of FIG. 5 represents the BCP feature 7 in the minimum energy state. The curve 19 of FIG. 5 represents the energy of the BCP feature 7 and the displacement path along which the type A polymer domain 8 returns to the minimum energy position after the potential is released. The curve 19 is determined by the recording of the energy of the BCP feature 7 and the displacement of the type A polymer domain during step 104. The behavior of the BCP feature 7 may be a result of the polymers which comprise the BCP feature 7 acting as entropic springs.

Applying a potential to the simulation of the BCP feature 7 may in practice displace the type A polymer domain 8 beyond the point 17 depicted in FIG. 5. However one or more steps of the simulation may be run after releasing the potential before the energy of the BCP feature 7 and the displacement of the type A polymer domain are recorded. For example, the point 17 may represent the first point at which the energy of the BCP feature 7 and the displacement of the type A polymer domain are recorded. However, the type A polymer domain may have been displaced beyond point 17 when the potential was applied. The one or more steps of the simulation in between the release of the potential and the recording of the energy of the BCP feature 7 and the displacement of the type A polymer domain 8 may help ensure that the potential has been completely removed from the simulation.

For any given simulation, the BCP feature 7 only returns along one half of the curve 19. The half of the curve 19 along which the BCP feature 7 returns is determined by the direction of the displacement of the type A polymer domain. The direction of the displacement of the type A polymer domain is determined by the position at which the potential is applied. In the example shown in FIG. 5, the BCP feature 7 and the curve 19 are substantially symmetric and the full curve 19 may therefore be determined from a single simulation. A non-symmetric BCP feature may require a plurality of simulations to be performed. For example, the plurality of simulations may each comprise applying a potential which causes a displacement of the type A polymer domain 8 in a different direction. The simulations may then allow a curve 19 of the energy state of the BCP feature 7 as a function of the displacement of the type A polymer domain 8 to be constructed for each of the displacement directions used in the plurality of simulations.

Figure 6:
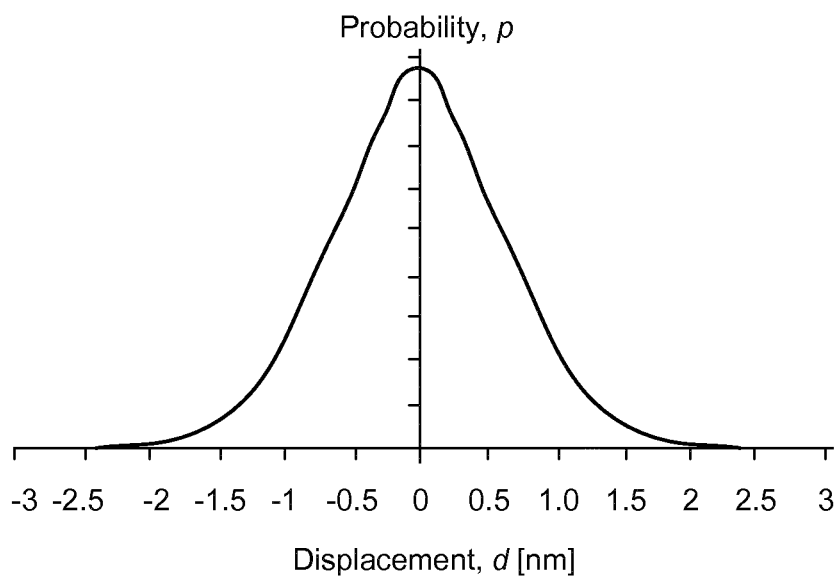
FIG. 6 is a schematic graph of the probability of the polymer domain having different displacements.
Figure 7:
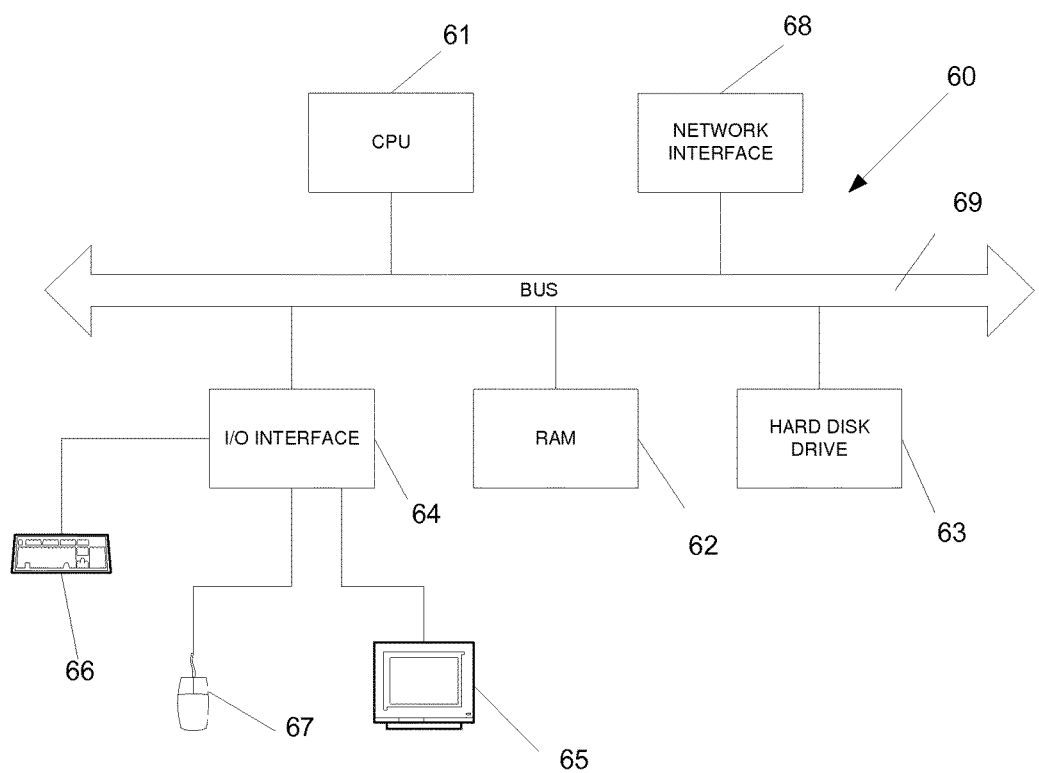
FIG. 7 is a schematic depiction of a computer suitable for implementing an embodiment of the invention.

At step 105 of FIG. 4 a distribution of the probability p of the type A polymer domain being at different displacements d from the minimum energy state is calculated. FIG. 6 is a schematic graph of one such probability distribution. The probability distribution represents the probability that the type A polymer domain 8 will assemble at different displacements from the minimum energy position when no potential is applied to the BCP feature 7. The probability distribution is calculated, for example, from the curve 19 of FIG. 5.

Interactions between the large number of molecules which comprise the BCP feature 7 results in an element of randomness to the behavior of the BCP feature 7. This results in a non-zero probability that the BCP feature 7 will adopt an energy state other than the minimum energy state even when no potential is applied. For a given plurality of BCP features 7, the different BCP features 7 may adopt a number of different energy states. The distribution of energy states adopted by the plurality of BCP features 7 may be considered to follow a Boltzmann distribution. The distribution of energy states results in a distribution of displacements d of the type A polymer domain 8 from the minimum energy position. This gives rise to a distribution of the probability that any given BCP feature 7 will have a type A polymer domain which is displaced from the minimum energy position. For the cylindrical BCP feature 7 depicted in FIG. 3 the probability distribution may be calculated according to equation 2.

$$p(d) = c(e^{\frac{-\Delta E(d)}{kT}}) \quad (2)$$

where p(d) is the probability of a type A polymer domain 8 having a displacement d from the minimum energy position, ΔE(d)/kT is the scaled difference in energy from the ground state energy when the type A polymer domain 8 has a displacement d, and c is a normalization constant. The normalization constant c is set to ensure that the integral of the probability distribution is equal to 1. The function ΔE(d)/kT was determined during step 104 and is represented by the curve 19 shown in FIG. 5. The determination of ΔE(d)/kT during step 104 allows the probability distribution p(d) to be calculated across a range of displacements d using equation 2. The results of a calculation of the probability distribution p(d) are shown in FIG. 6.

At step 106 of FIG. 4 the uncertainty $\sigma_{DSA}$ in the position of the type A polymer domain within the BCP feature 7 is calculated from the probability distribution p(d). The uncertainty $\sigma_{DSA}$ may for example be calculated by fitting a Gaussian distribution to the probability distribution. A Gaussian distribution of the probability p as a function of displacement d is given by equation 3.

$$p(d) = \frac{1}{s\sqrt{2\pi}} e^{\left(\frac{-(d)^2}{2s^2}\right)} \quad (3)$$

where s is the standard deviation of the Gaussian distribution. The uncertainty $\sigma_{DSA}$ in the positioning of a type A polymer domain 8 within a BCP feature 7 may be considered to be equal to the standard deviation s of the Gaussian distribution of equation 3.

The standard deviation s, and therefore the uncertainty $\sigma_{DSA}$, may be determined by fitting a Gaussian distribution to the probability distribution. A Gaussian distribution may be fitted to the probability distribution using a known numerical method to determine a value of s which minimizes a difference between the Gaussian distribution and the probability distribution. The numerical method may, for example, comprise performing a least squares fit between the Gaussian distribution and the probability distribution. The value of the standard deviation s derived from a least squares fit may be considered to be the uncertainty $\sigma_{DSA}$.

If the curve 19 of FIG. 5 is a perfect parabola (i.e. $\Delta E/kT = mx^2$ where m is a constant) then the probability distribution p(d) is a Gaussian distribution and therefore the fitted Gaussian distribution will fit the probability distribution perfectly.

The combined uncertainty $\sigma_A$ associated with the positioning of a type A polymer domain 8 on the substrate 1 may be calculated from the calculated uncertainty $\sigma_{DSA}$ and the known uncertainty $\sigma^{lith}$ according to equation 1. For a lithographic application the value $3\sigma_A$ may used (almost all features may be assumed to fall within $3\sigma_A$ of the desired position).

Figure 9:
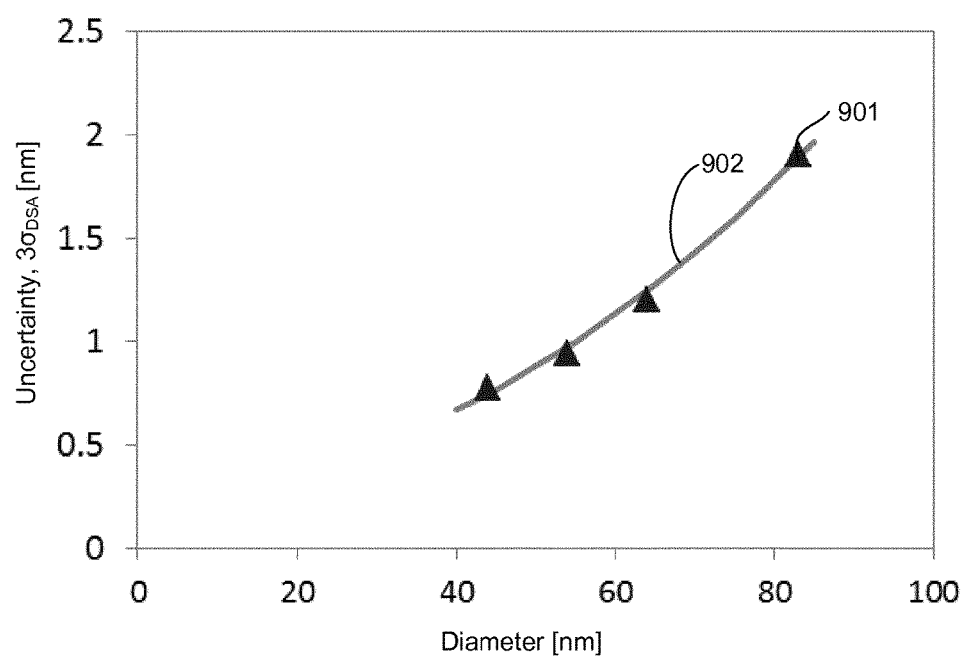
FIG. 9 is a schematic graph of the calculated uncertainty in the position of the polymer domain within a block copolymer feature as a function of the diameter of the block copolymer feature.

FIG. 9 shows a computer 60. The computer 60 may implement a simulation of a BCP feature and calculate an uncertainty associated with the positioning of a polymer domain with the BCP feature using the methods described herein. The computer 60 comprises a CPU (central processing unit) 61 which is configured to read and execute instructions stored in a memory 62 which may take the form of a random access memory. The memory 62 stores instructions for execution by the CPU 61 and data used by those instructions. For example, in use, a digital representation of a BCP feature may be stored in the memory 62, together with instructions suitable for causing the computer to carry out a method as described herein.

The computer 60 may further comprise storage in the form of a hard disc drive 63. The digital representation of the BCP feature may be stored on the hard disc drive 63. The computer 60 may further comprise an I/O (input/output) interface 64 to which is connected one or more peripheral devices used in connection with the computer 60. For instance, a display 65 may be provided so as to display output from the computer 60. The display 65 may, for example, display a representation of the BCP feature. Additionally, the display 65 may display one or more images generated by processing of the simulated BCP feature such as a graph of FIG. 5 and/or FIG. 6, or a design of a substrate such as shown in FIG. 2. One or more input devices may be connected to the interface 64. Such an input device may include a keyboard 66 and/or a mouse 67 which allows user interaction with the computer 60.

A network interface 68 may be provided to allow the computer 60 to be connected to an appropriate computer network so as to receive and/or transmit data from and to other computing devices. The CPU 61, memory 62, storage 63, I/O interface 64 and network interface 68, are connected together by a bus 69.

Figure 8:
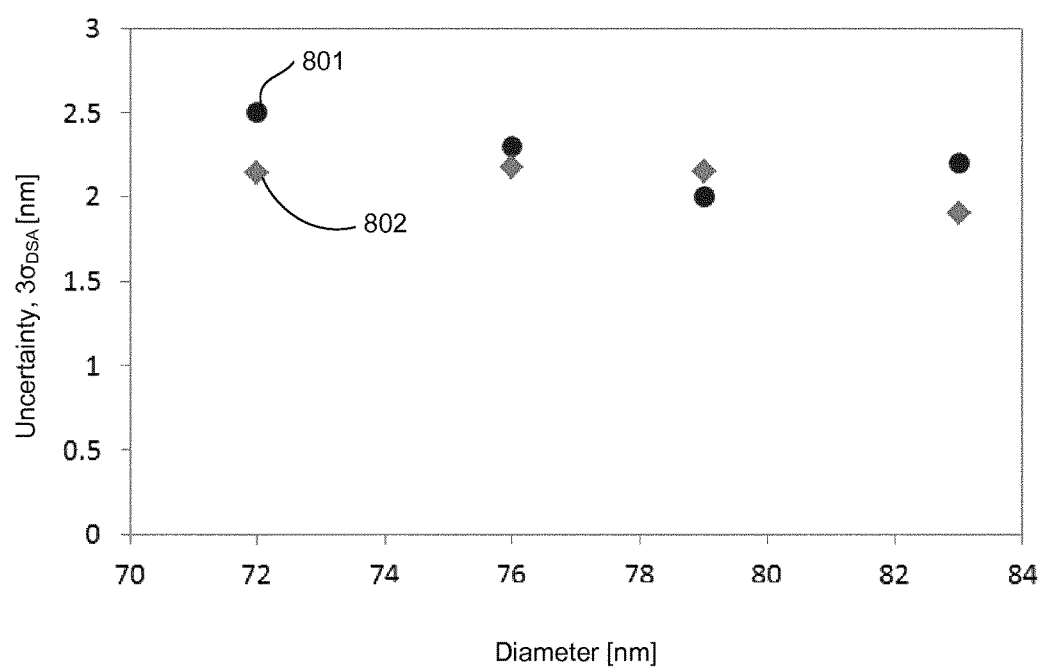
FIG. 8 is a schematic graph of calculated and experimentally determined uncertainty in the position of the polymer domain within a block copolymer feature.

Embodiments of the invention may provide one or more advantages over other methods for the design of components manufactured using self-assembly of block copolymer. FIG. 8 is a schematic graph of $3\sigma_{DSA}$ uncertainty in the position of a type A polymer domain 8 within a block copolymer feature 7 as a function of the diameter of the block copolymer feature 7. Points 801 are experimentally determined $3\sigma_{DSA}$ uncertainties. Points 802 are $3\sigma_{DSA}$ uncertainties calculated using a method disclosed herein. FIG. 8 shows good agreement between the experimentally determined uncertainties 801 and the calculated uncertainties 802. The methods disclosed herein to calculate the $3\sigma_{DSA}$ uncertainty may therefore be used to reliably determine the uncertainty which may be expected to occur in practical implementation of device manufacture using self-assembly block copolymer.

Calculated positioning uncertainty of block copolymer features may be taken into account during the design and/or manufacture of a component using self-assembly block copolymer. FIG. 9 is a schematic graph of calculated $3\sigma_{DSA}$ uncertainties in the position of a type A polymer domain 8 within a block copolymer feature 7 as a function of the diameter of the block copolymer feature 7 (calculated for a larger range of diameters than is shown in FIG. 8). Points 901 are calculated using a method disclosed herein. FIG. 9 shows that the $3\sigma_{DSA}$ uncertainty decreases as the diameter of a BCP feature 7 is decreased. Line 902 is a quadratic fit to the points 901.

A reliable knowledge of the $3\sigma_{DSA}$ uncertainty in the positioning of a polymer domain within a BCP feature (as is for example provided by FIGS. 8 and 9) may be used to design a pattern of features to be formed on a substrate. The knowledge may also be used to design a component which comprises the pattern of features. For example, a pattern of features having reduced feature size and/or feature separation may be achieved. For example the width of a BCP feature may be reduced in order to reduce the $3\sigma_{DSA}$ uncertainty in the positioning of a polymer domain within the BCP feature.

A pattern of features, once designed taking into account the calculated probability distribution of BCP features, may be formed on a substrate. The pattern of features may, for example, form part of a component, e.g. an integrated circuit.

It will be appreciated that aspects of the invention can be implemented in any convenient form. For example, an embodiment of the invention may be implemented by one or more appropriate computer programs which may be carried on an appropriate carrier medium which may be a tangible carrier medium (e.g. a disk) or an intangible carrier medium (e.g. a communications signal). Embodiments of the invention may be implemented using suitable apparatus which may specifically take the form of a programmable computer running a computer program arranged to implement a method as described herein.

It should also be appreciated that while the uncertainty in the position of type A polymer domain has been described, the term type A polymer domain should not be limited to a specific type of polymer domain. The terms type A polymer domain and type B polymer domain are used solely to differentiate between different polymer domains with reference to the Figures.

A resist recess and BCP feature shape other than the cylindrical feature described above may be simulated according to an embodiment of the invention. For example, a cubic, tetragonal or hexagonal feature shape may be simulated and the uncertainty in the positioning of a polymer domain within the feature may be calculated. Cylindrical features which are joined by a linear trench-like feature may be simulated and polymer domain feature position uncertainties calculated. Other shapes of BCP features which may be simulated and polymer domain feature position uncertainties calculated may include elliptical and rectangular shaped features.

It should be appreciated that any reference to maximum or minimum energy may not necessarily correspond to an absolute maximum or minimum energy. A maximum or minimum energy may instead refer only to a local maximum or minimum energy. It should be further appreciated that any reference to being at a maximum or minimum energy should not be limited to being precisely at the maximum or minimum energy but merely substantially at the maximum or minimum energy.

It will be appreciated that the use of resist to form a sidewall of a recess is intended to be an example, rather than a limiting feature. For example, a recess may be provided by patterning of the substrate itself, or patterning of a layer deposited or grown onto the substrate. A recess may itself be provided by the self-assembly of BCP material.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the appended claims.

The invention claimed is:

1. A method comprising:
performing a computer simulation, by a hardware processor system, of a self-assembly block copolymer feature, wherein the simulated block copolymer feature comprises a first domain comprising a first polymer type and a second domain comprising a second polymer type;
calculating a minimum energy position of the first domain within the simulated block copolymer feature, wherein the minimum energy position is the position of the first domain at a first energy state of the block copolymer feature, the first energy state being substantially at a minimum energy;
performing a computer simulation, by the hardware processor system, of the application of a potential to the block copolymer feature, wherein the potential causes the position of the first domain to be displaced from the minimum energy position;
performing a computer simulation, by the hardware processor system, of release of the potential, thereby allowing the energy of the block copolymer feature to relax to substantially the minimum energy;
recording a plurality of energies of the block copolymer feature as the block copolymer feature relaxes to substantially the minimum energy;
recording at each of the plurality of energies a displacement of the first domain from the minimum energy position;
calculating, from the recorded energies of the block copolymer feature and the recorded displacements of the first domain, a probability distribution indicating a probability of the first domain being displaced from the minimum energy position;
calculating, from the probability distribution, an uncertainty in the position of the first domain within the block copolymer feature; and
generating electronic data using the calculated uncertainty to enable fabrication of a pre-patterned substrate for block copolymer self-assembly and/or fabrication of a self-assembled block copolymer, where the electronic data, or information derived therefrom, is used in a fabrication process of a pre-patterned substrate for block copolymer self-assembly and/or in a process of self-assembly of block copolymer.

2. The method of claim 1, wherein the first domain is surrounded by the second domain.

3. The method of claim 1, further comprising determining, from the uncertainty in the position of the first domain within the block copolymer feature, an uncertainty in the position of the first domain on a substrate.

4. The method of claim 3, further comprising, as part of the fabrication process of a pre-patterned substrate for block copolymer self-assembly, using the calculated uncertainty in the position of the first domain on a substrate to design a recess pattern for pre-patterning a substrate.

5. The method of claim 1, wherein simulating the application of a potential comprises simulating an increase in a chemical potential of the block copolymer feature.

6. The method of claim 1, wherein calculating the probability distribution comprises assuming a Boltzmann distribution of energies of the block copolymer feature.

7. The method of claim 1, wherein calculating the uncertainty in the position of the first domain within the block copolymer feature comprises fitting a Gaussian distribution to the probability distribution.

8. The method of claim 7, wherein calculating the uncertainty in the position of the first domain within the block copolymer feature further comprises calculating a standard deviation of the Gaussian distribution.

9. The method of claim 1, wherein the block copolymer feature is cylindrical.

10. The method of claim 1, wherein the first domain is cylindrical.

11. The method of claim 1, wherein the minimum energy position is substantially at the geometric center of the block copolymer feature.

12. The method of claim 1, wherein the block copolymer feature has a width of between 20 and 100 nanometers.

13. The method of claim 1, wherein the first domain has a width of between 5 and 50 nanometers.

14. The method of claim 1, further comprising, as part of the fabrication process of a pre-patterned substrate for block copolymer self-assembly, using the calculated uncertainty in the position of the first domain within the block copolymer feature to design a recess pattern for pre-patterning a substrate.

15. The method of claim 14, wherein designing the recess pattern for pre-patterning a substrate comprises simulating a lithographic process.

16. The method of claim 14, further comprising pre-patterning a substrate based on the designed recess pattern.

17. The method of claim 1, further comprising, as part of the process of self-assembly of block copolymer, designing an electronic or other device for manufacture using a self-assembly block copolymer based upon the calculated uncertainty in the position of the first domain within the block copolymer feature.

18. The method of claim 17, further comprising forming a pattern of features which comprises the electronic or other device on a substrate according to the design using a self-assembly block copolymer.

19. The method of claim 1, further comprising providing, as part of the process of self-assembly of block copolymer, an electronic representation of the uncertainty in the position of the first domain within the block copolymer feature for use in designing and/or manufacturing a pattern of features on a substrate using a self-assembly block copolymer.

20. A method comprising:
performing a computer simulation, by a hardware processor system, of a self-assembly block copolymer feature, wherein the simulated block copolymer feature comprises a first domain comprising a first polymer type and a second domain comprising a second polymer type;
calculating a minimum energy position of the first domain within simulated the block copolymer feature, wherein the minimum energy position is the position of the first domain at a first energy state of the block copolymer feature, the first energy state being substantially a minimum energy;

performing a computer simulation, by the hardware processor system, of the application of a potential to the block copolymer feature, wherein the potential causes the position of the first domain to be displaced from the minimum energy position;

performing a computer simulation, by the hardware processor system, of release of the potential, thereby allowing the energy of the block copolymer feature to relax to substantially the minimum energy;

recording a plurality of energies of the block copolymer feature as the block copolymer feature relaxes to substantially the minimum energy;

recording at each of the plurality of energies a displacement of the first domain from the minimum energy position;

calculating, from the recorded energies of the block copolymer feature and the recorded displacements of the first domain, a probability distribution indicating a probability of the first domain being displaced from the minimum energy position;

calculating, from the probability distribution, an uncertainty in the position of the first domain within the block copolymer feature;

using the uncertainty in the position of the first domain within the self-assembly block copolymer feature to design a pattern of features; and forming the pattern of features on a substrate according to the design using the self-assembly block copolymer.

21. A non-transitory computer-readable medium carrying a computer program comprising computer readable instructions configured to cause a hardware computer to:

perform a computer simulation of a self-assembly block copolymer feature, wherein the simulated block copolymer feature comprises a first domain comprising a first polymer type and a second domain comprising a second polymer type;

calculate a minimum energy position of the first domain within the simulated block copolymer feature, wherein the minimum energy position is the position of the first domain at a first energy state of the block copolymer feature, the first energy state being substantially at a minimum energy;

perform a computer simulation of the application of a potential to the block copolymer feature, wherein the potential causes the position of the first domain to be displaced from the minimum energy position;

perform a computer simulation of release of the potential, thereby allowing the energy of the block copolymer feature to relax to substantially the minimum energy;

record a plurality of energies of the block copolymer feature as the block copolymer feature relaxes to substantially the minimum energy;

record at each of the plurality of energies a displacement of the first domain from the minimum energy position;

calculate, from the recorded energies of the block copolymer feature and the recorded displacements of the first domain, a probability distribution indicating a probability of the first domain being displaced from the minimum energy position;

calculate, from the probability distribution, an uncertainty in the position of the first domain within the block copolymer feature; and generate electronic data using the calculated uncertainty to enable fabrication of a pre-patterned substrate for block copolymer self-assembly and/or fabrication of a self-assembled block copolymer, where the electronic data, or information derived therefrom, is used in a fabrication process of a pre-patterned substrate for block copolymer self-assembly and/or in a process of self-assembly of block copolymer.

22. The non-transitory computer-readable medium of claim 21, wherein the calculated uncertainty in the position of the first domain within the block copolymer is used, as part of the process of self-assembly of block copolymer, in designing a pattern of features on a substrate using a self-assembly block copolymer.

23. The non-transitory computer-readable medium of claim 22, wherein the pattern of features are formed on the substrate using the self-assembly block copolymer and the pattern of features are used to create an electronic or other device.

* * * * *